United States Patent
Tanabe et al.

(10) Patent No.: US 6,177,176 B1
(45) Date of Patent: Jan. 23, 2001

(54) INFORMATION RECORDING MEDIUM READABLE FROM A SIDE EDGE

(75) Inventors: Hiroshi Tanabe; Mizuho Hiraoka, both of Kawasaki; Kouichi Yoshida, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/811,297

(22) Filed: Mar. 4, 1997

(30) Foreign Application Priority Data

Mar. 5, 1996 (JP) .................................................. 8-047244

(51) Int. Cl.$^7$ ........................................................ B32B 23/02
(52) U.S. Cl. ........................ 428/192; 369/283; 428/207; 428/209; 428/694 DE; 428/913; 430/270.11; 430/945
(58) Field of Search .................................. 428/64.1, 64.4, 428/64.7, 914, 412, 694 DE, 694 MT, 694 RL, 694 MM, 65.1, 64.3; 430/270.11, 270.12, 270.14; 369/283, 288, 275.1, 275.4; G06K 19/062, 19/07, 19/08, 19/14, 19/073

(56) References Cited

U.S. PATENT DOCUMENTS

| | | | |
|---|---|---|---|
| 5,316,814 | * 5/1994 | Sawada et al. | 428/64 |
| 5,360,651 | * 11/1994 | Baxter et al. | 428/64 |
| 5,538,773 | * 7/1996 | Kondo | 428/64.1 |
| 5,703,867 | 12/1997 | Miyauchi et al. | 369/275.3 |
| 5,754,523 | 5/1998 | Deguchi et al. | 369/275.4 |
| 5,895,697 | * 4/1999 | Tajima et al. | 428/64.1 |

FOREIGN PATENT DOCUMENTS

| | | | |
|---|---|---|---|
| 384274 | * 8/1990 | (EP) | . |
| 49877-90 | * 8/1990 | (AU) | . |
| 2170768 | * 9/1973 | (FR) | . |
| 2218596 | * 9/1974 | (FR) | . |
| 1414817 | * 11/1975 | (GB) | . |
| 1424442 | * 2/1976 | (GB) | . |
| 1453781 | * 10/1976 | (GB) | . |

* cited by examiner

Primary Examiner—William Krynski
Assistant Examiner—Michael E. Grendzynski
(74) Attorney, Agent, or Firm—Fitzpatrick, Cella, Harper & Scinto

(57) ABSTRACT

An information recording medium comprising a stack of layers includes a recording layer interposed between two shielding layers, the shielding layers being opaque to radiation within a predetermined wavelength band. The recording layer is adjacent to a layer which is transparent to radiation within the predetermined wavelength band, and is readable by radiation within the predetermined wavelength band passing into the layer through a free edge of the layer.

23 Claims, 10 Drawing Sheets

INFORMATION RECORDING MEDIUM READABLE FROM A SIDE EDGE

BACKGROUND OF THE INVENTION

1. Field of the Invention

This invention relates to an information recording medium and a process for production thereof. The invention relates particularly, although not exclusively to a reliable information recording medium which is resistant to forgery and a process for production thereof.

2. Related Background Art

To date magnetic recording cards, such as credit cards or bank cards and so on have been used as portable information recording media. In recent years, IC cards, optical cards and so on have been proposed as a portable information media which have a larger recording capacity. Using such a larger recording capacity, it has been proposed to use such media as electric money or bank cards capable of recording dealings with a bank.

In such portable information media which are used to record important information relating to money and so on, it is important that improper use of the media, such as the use of stolen or lost information recording media, is difficult, and faking of the media is also difficult.

One method of preventing faking of a medium, is to provide a picture of the medium owner's face personal data, or data relating to the distributor of the information recording media etc., as holographic information in the information recording medium as initial information before distribution of the medium.

In order to produce such a medium, various methods are used in order to create difficulties in faking the information on the recording medium. For example it is known to form the above mentioned initial information on a thin sheet and attach the sheet to a card. In addition to providing such initial information, a lot of media processing is used for the purpose of preventing fake media. For example in a laminate type card in which a transparent sheet is laminated on an information sheet, it is possible to insert a watermark or special microprint.

In particular where such an information recording medium has a large recording capacity intended for extensive use, if the information recording medium is faked, the social effect is forecast to be very large.

Therefore in such an information recording medium, it is necessary to provide information which is more difficult to fake in order to prevent faking of the information.

SUMMARY OF THE INVENTION

An object of this invention is to provide an information recording medium which is difficult to fake. Another object of this invention is to provide a process for production of an information recording medium which is difficult to fake.

According to a first aspect of the invention there is provided an information recording medium comprising a stack of layers including a recording layer interposed between two shielding layers, the shielding layers being opaque to radiation within a predetermined waveband, (i.e., having a wavelength band that is used to record information to the recording layer or read information stored in the recording layer) said recording layer being adjacent to at least one layer which is transparent to radiation within the predetermined waveband, the recording layer being readable from an edge of the medium by radiation within the predetermined waveband passing into said one layer.

According to a second aspect of the invention there is provided a process for production of an information recording medium according to the first aspect of the invention including the steps of forming said stack of layers and laminating said stack of layers.

In a medium in accordance with the first aspect of the invention, information in the first recording layer may be reproduced only from the edge of the information recording medium, the first recording layer being embedded in the recording medium.

When such an information recording medium is faked, it is necessary to reproduce the medium production from the beginning. Therefore, there are more steps required to produce a fake, as compared to a recording medium that uses fake preventing means comprising only attaching an initial information recorded sheet with media according to the invention, it is possible to obtain more valuable fake preventing effect than prior art media.

As it is difficult to alter, it is possible to prevent the improper use of stolen or picked up information recording media.

The design of the medium to reduce the possibility of faked media being produced does not reduce the display region which may be used for display of information on the surface of the information recording medium. In recent years, it has been proposed that a portable information recording medium comprises an IC chip, an optical recording part, or a hybrid type medium including a plurality of information recording means such as a magnetic recording area. It is preferable that an electrode of an IC chip or magnetic recording area is exposed from the information recording medium. In this invention, the information for the sake of fake preventing does not affect the freedom of placing the information recording means such as the IC chip or magnetic recording part.

BRIEF DESCRIPTION OF THE DRAWINGS

A number of embodiments of the invention will now be described, by way of example only, with reference to the accompanying drawings in which.

DETAILED DESCRIPTION OF THE INVENTION

FIRST EMBODIMENT

Figure 1A:
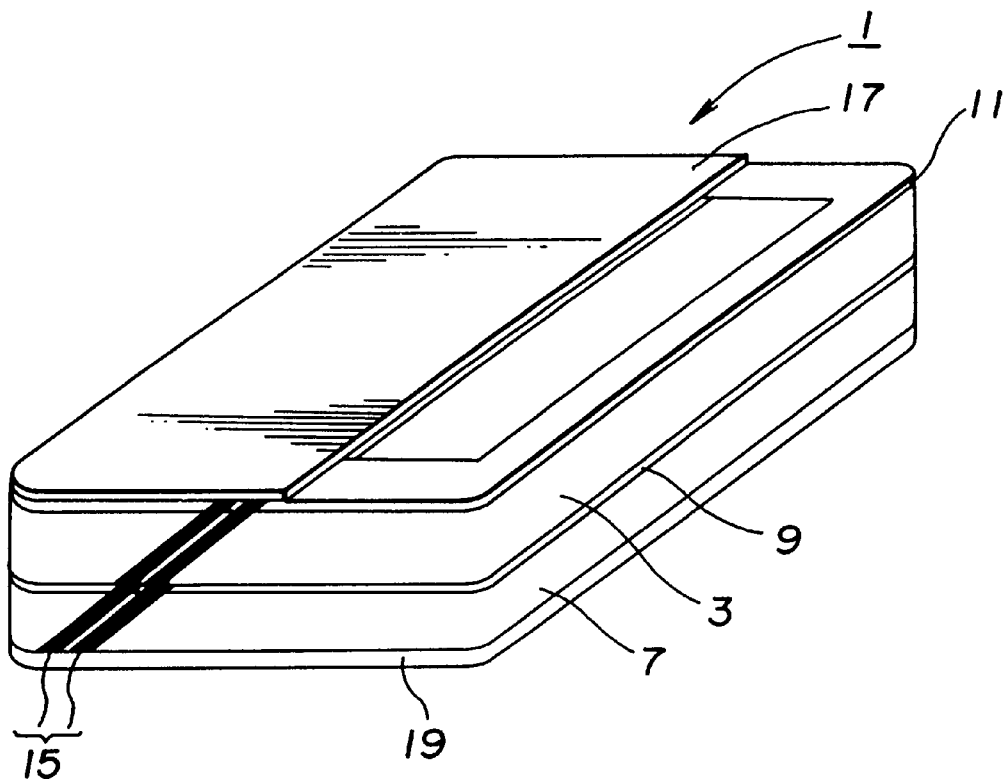
FIG. 1(a) is a schematic isometric view of an information recording medium in accordance with a first embodiment of the invention.
Figure 1B:
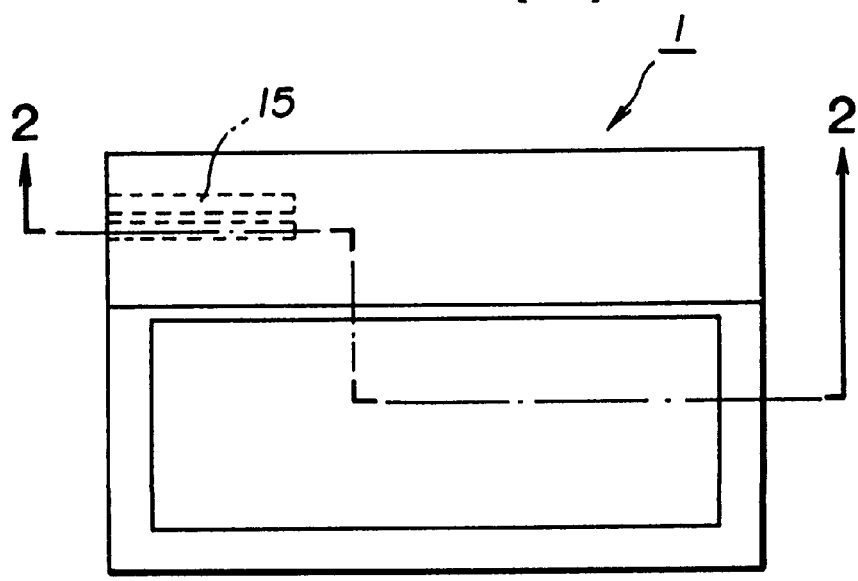
FIG. 1(b) is a schematic plan view of the information recording medium shown in FIG. 1(a).
Figure 2:
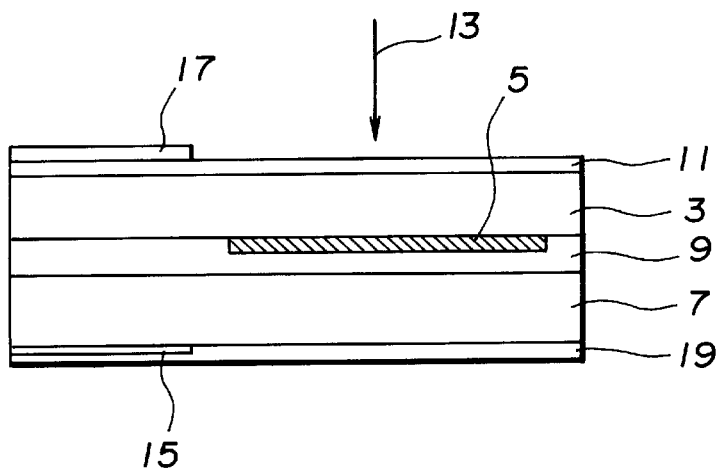
FIG. 2 is a schematic cross sectional view taken on line 2—2 of FIG. 1(b).

FIGS. 1 and 2 illustrate schematically an information recording medium in accordance with a first embodiment of the invention. The medium comprises an optical card 1 including a substrate 3 carrying an optical recording layer (first recording layer) 5 capable of recording and reproducing optical information. A protective layer 7 is attached by means of an adhesive layer 9 on the surface of the substrate 3 to the surface carrying the first recording layer 5. A hard coat layer 11 is formed on the opposite surface of the substrate to the first recording layer 5. The hard coat layer 11 is effective to prevent the surface of the substrate 3 from being damaged by an incident light beam 13 for example, in the infrared region wave length band which is used for recording and reproducing information.

The substrate 3 is transparent to the incident infrared light beam 13 and to visible light. The protective layer 7 and the adhesive layer 9 are transparent at least to visible light. Two stripes forming a second recording layer 15 which carries particular information are formed on the surface of the protective layer 7 remote from the substrate 3 using a printed ink which appears blue under visible light.

A first shielding layer 17 is formed on the surface of hard coat 11 remote from the substrate 3. The second recording layer 15 is arranged such that the second recording layer 15 is not visible under visible light from the substrate side of the optical card 1 due to first shielding layer 17. The second recording layer 15 is also not visible from the protective layer 7 side of the optical card 1 because of a second shielding layer 19 formed on the protective layer 7.

Thus the second recording layer 15 is not visible from either the substrate 3 side or the protective layer 7 side of the optical card 1 because of the shielding layers 17 and 19. However, as shown in FIG. 1(a) the second recording layer 15 is visible under visible light from the edge of the card 1 through the substrate 3, the protective layer 7 and the adhesive layer 9 which are transparent as to the visible light. As the second recording layer 15 is not visible from the major surfaces of the card 1 because of the shielding layers 17 and 19, it is possible to tell a genuine optical card from a simple fake optical card which copies the position of the recording layer 5 of a genuine optical card, by the existence of the second recording layer 15.

If such an optical card is going to be faked, it is necessary to form the second recording layer 15 so as to contact the transparent protective layer 7. If a print layer is going to be formed for example by remodelling an existing optical card, it is necessary to remove the shielding layer 19 on the protective layer 7, to prepare the transparent surface of the protective layer 7, to form the second recording layer 15 on the surface of the protective layer 7, and to form the shielding layer 19. In this case many steps are needed to provide a fake card including the second recording layer 15. As can be seen, the inclusion of the second recording layer 15 increases the difficulty of faking the optical card, and thus increases the reliability of the optical card.

As the second recording layer 15 is not recognizable from the major surfaces of the card 1, it is, as an option, possible to design the surface of the shielding layer 17 to make it more difficult to fake the optical card, for example by providing information using for example printing on the surface of the shielding layer 17. If such an optical card is going to be faked, it is necessary to form printed information on the surface of the shielding layer 17 in addition to forming the second recording layer 15 contacting the transparent protective layer 7. In this case the difficulty in producing take cards increases further.

The information carried in the second recording layer 15 is not restricted as long as it is recognizable from the side of the optical card 1. In particular, visible patterns, characters, designs and so on can be used. As for the color of the information, all colors are available if they are not visible through the major surfaces of the card 1. In particular a fluorescent ink is preferable because it is more easily recognized.

In an optical card according to this embodiment, the method of forming the second recording layer 15 is not restricted as long as it is possible to provide the desired information on the surface of the protective layer 7. Thus, for example known methods such as gravure coating are available.

The kind or color of the information can be changed to suit the distributor of the optical card, for example a credit card company or bank. Even if the distributor is the same for all cards, it is possible to change the color or information according to the year of distribution. In this case the difficulty of producing fake cards increases further.

With regard to the distance between the second recording layer 15 and the first shielding layer 17, this is preferably more than 150pm, more preferably more than 400 μm, so as to increase the certainty of recognition of the information from the side of the optical card 1. If the transparent layer 7 between the second recording layer 15 and the first shielding layer 17 comprises laminated layers of different materials, the total thickness of the laminated layers may be chosen to meet the above mentioned condition. In particular where the protective layer 7 is fixed to the substrate 3 with an adhesive layer 9, and the adhesive layer 9 is transparent, making the total thickness of the protective layer 7 and the adhesive layer 9 satisfy the above mentioned condition, this increases the ease of reading the information which is carried in the second recording layer 15 from the side of the card 1. In this case, if the difference of the refractive index of layers which are comprised of different materials is within 0.2, especially within 0.1 there is little reflection at the interfaces between the transparent layers. Therefore it is easy to recognize accurately the information in the second recording layer 15 from the side of the card 1.

As the shielding layers 17 and 19, an opaque layer which prevents the second recording layer 15 from being recognized from the major surfaces of the optical card 1 under visible light may be used. By "opaque" is meant a transmissivity of the information of the second recording layer 15 with a particular reproducing light of 5% or less, preferably 2% or less. Examples of such layers include a printed layer, plastic film, metal sheet and opaque paper which includes a certain quantity of pigments (titanium oxide, aluminium oxide etc.), or metal particles (aluminium etc.). The shielding layers 17, 19 composed of a printed layer may be formed by, for example, providing ink including the above mentioned pigments or metal particles on a surface using a known printing method. If a plastic film, metal sheet or paper is used, it is attached to the surface of the optical card 1 using for example adhesive glue.

In the embodiments of this invention, the shielding layers can be layers which provide other functions for the optical card. For example, as the shielding layer 17, a resin film carrying a magnetic stripe constituting a magnetic recording layer for the optical card 1 can be used. The shielding layer 19 can be a printed layer which provides information on the surface of the protective layer 7 or an underlying layer.

The substrate 3 of the optical card 1, may be formed from, for example, glass plate, plastic resins such as polycarbonate, polyvinylchloride, or polymethylmethacrylate.

If at least one of a recording light beam and a reproducing light beam is used to irradiate the first recording layer 5 through the substrate 3, an a durable hard coat layer 11 which protects the surface of the substrate 3 from flaws or dust is useful. A thin film of light setting type resin, epoxy resin, acrylate resin, silicone resin are examples of suitable materials for the hard coat layer 11.

Everything such as magnetic stripes, design printing, bar code, OCR characters, hologram, sign panels and so on, which are provided on conventional credit cards can be provided on the surface of the optical card substrate 3.

As the first recording layer 5, any optical recording materials which are capable of being recorded or reproduced by a laser beam may be used, for example organic dye recording materials, and metallic recording materials. A reflective layer, an underlying layer and so on can be added.

As the adhesive layer 9, the usual adhesive agent may be used. Examples of suitable materials are polymer or copolymer of vinyl monomer such as vinyl acetate, acrylic acid ester, vinyl chloride, ethylene, acrylic acid, acrylic amide, thermoplastic adhesive glue such as polyamide, polyester, epoxy, adhesive glue such as amino resin (urea resin, melamine resin), phenol resin, epoxy resin, urethane resin, thermosetting vinyl resin, rubber adhesive glue such as natural rubber, nitrile rubber, chloro rubber, and silicone rubber.

As the protective layer 7, the above mentioned materials which may be used for the optical card substrate 3 are usable because the protective layer 7 should also be transparent.

It is possible to provide an IC chip on at least one of the substrate 3 and the protective layer 7 to make a hybrid card which is capable of being recorded both by light and electrically.

SECOND AND THIRD EMBODIMENTS

Figure 3:
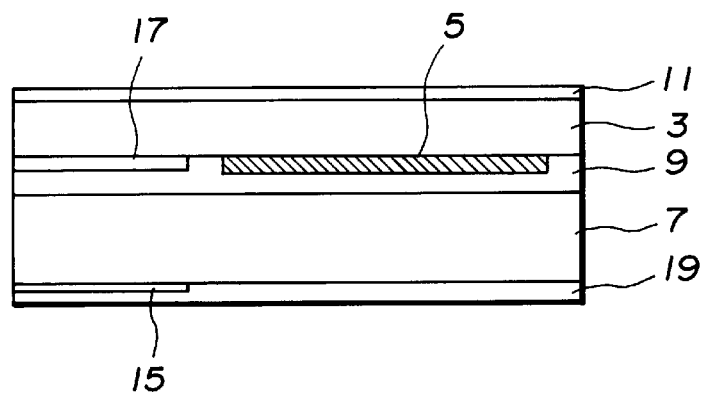
FIG. 3 is a schematic cross sectional view of an information recording medium in accordance with a second embodiment of the invention.

FIG. 3 shows an adaptation of the first embodiment in which the first shielding layer 17 of the optical card 1 shown in FIG. 1 and FIG. 2 is located between the transparent substrate 3 and the transparent adhesive layer 9.

Figure 4:
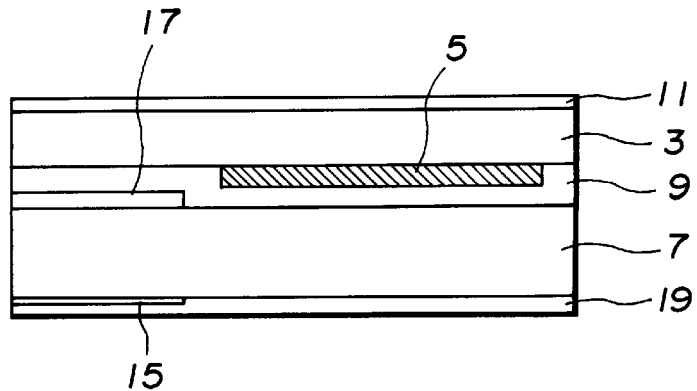
FIG. 4 is a schematic cross sectional view of an information recording medium in accordance with a third embodiment of the invention.

FIG. 4 shows another embodiment in which the first shielding layer 17 shown in FIG. 1 and FIG. 2 is located between the transparent protective layer 7 and the transparent adhesive layer 9.

FURTHER EMBODIMENTS

Other embodiments of an optical card in accordance with the invention will now be explained. Referring now also to FIGS. 5 and 6 the cards shown in these figures differ from the optical card shown in FIGS. 1 and 2 in that the second recording layer 15 is provided between the substrate 3 and the protective layer 7.

In the embodiments shown in FIG. 5 the second recording layer 15 is provided between the protective layer 7 and the adhesive layer 9.

In the embodiments shown in FIG. 6, the second recording layer is provided between the adhesive layer 9 and the substrate 3. In this case, it is preferable to provide the first shielding layer 17 on either or both of the side of the substrate 3 remote from the protective layer 7, and between the second recording layer 15 and the substrate 3. It is preferable to provide the second shielding layer 19 on either or both of the side of the protective layer 7 remote from the substrate 3, and between the protective substrate 7 and the second recording layer 15. If the first shielding layer 17 is provided between the substrate 3 and the second recording layer, it is preferable to provide the second shielding layer 19 on the side of the protective layer 7 which is remote from the substrate 3. If the second shielding layer is provided between the protective layer 7 and the second recording layer 15, it is preferable to provide the first shielding layer 17 on the side of the substrate 3 which is remote from the protective layer 7. In these arrangements it is possible to make a transparent layer contact with the second recording layer 15. Recognition of the information carried in the second recording layer 15 from the side of the optical card 1 thus becomes easy.

Figure 5A:
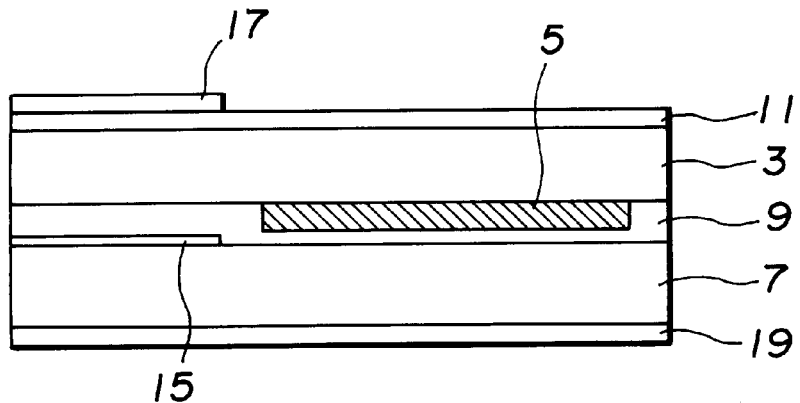
FIGS. 5(a), 5(b) and 5(c) are respectively schematic cross sectional views of an information recording medium in accordance with three variations of a fourth embodiment of the invention.

In FIG. 5(a) the first shielding layer 17 is provided at the side of the substrate 3 remote from the protective layer 7 and the second shielding layer 19 is provided on the surface of the protective layer 7 which is remote from the substrate 3.

Figure 5B:
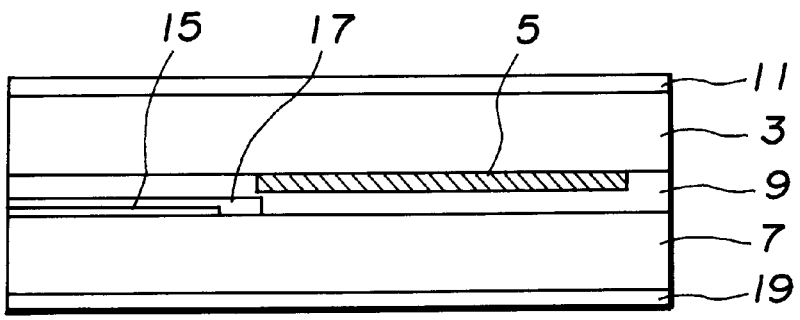
Figure 5C:
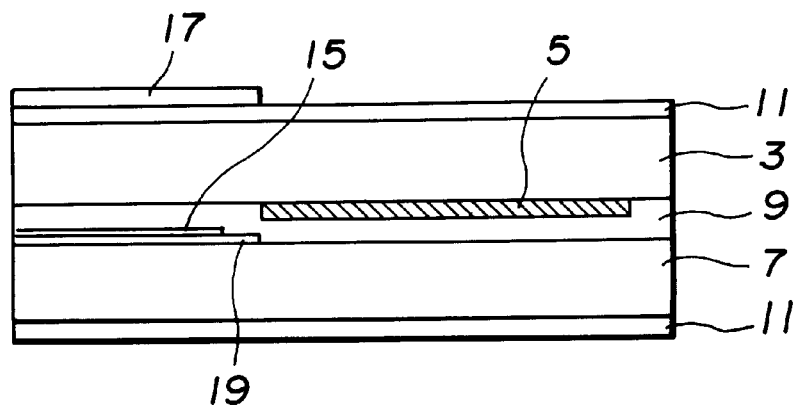

In FIG. 5(b) the first shielding layer 17 is provided on the surface of the second recording layer 15 which opposes the substrate 3. In FIG. 5(c) the second shielding layer 19 is provided between the protective layer 7 and the second recording layer 15.

Figure 6A:
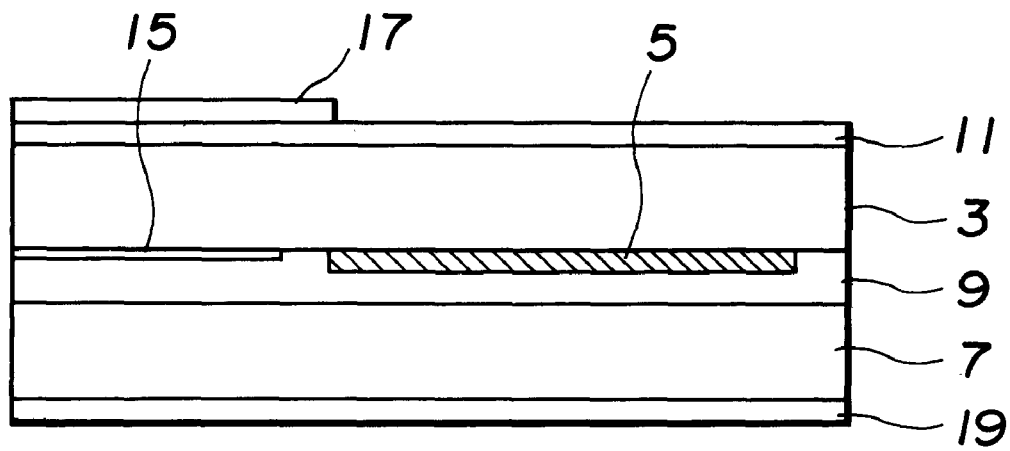
FIGS. 6(a) and 6(b) are respectively schematic cross sectional views of an information recording medium in accordance with two variations of a fifth embodiment of the invention.

In FIG. 6(a) the first shielding layer 17 is provided on the side of the substrate 3 which is remote from the protective layer 7, and the second shielding layer 19 is provided on the surface of the protective layer 7 which is remote from the substrate 3.

Figure 6B:
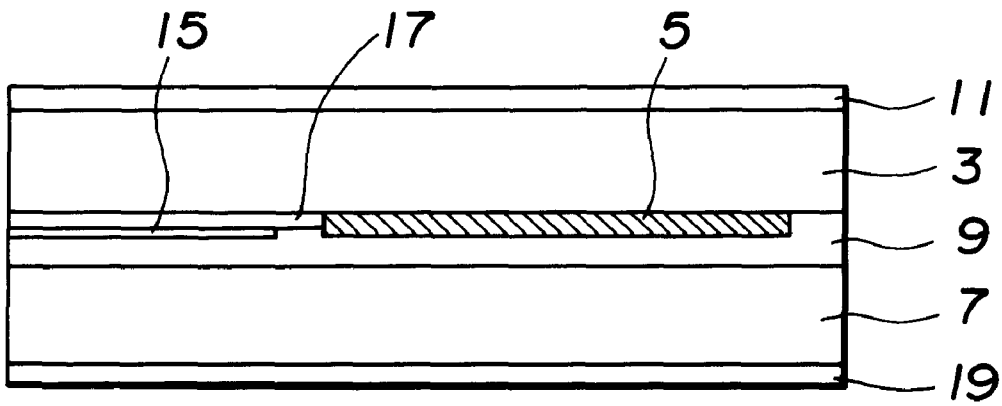

In FIG. 6(b) the first shielding layer 17 is provided between the substrate 3 and the second recording layer 15 and the second shielding layer 19 is provided on the surface of the protective layer 7 which is remote from the substrate 3.

Figure 7A:
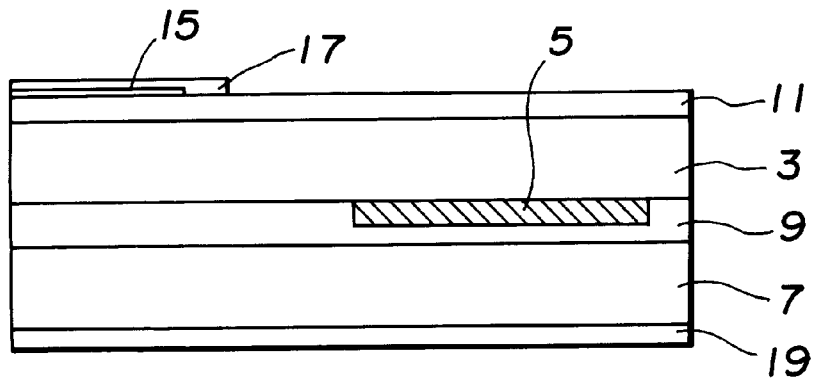
FIGS. 7(a), 7(b) and 7(c) are respectively schematic cross sectional views of an information recording medium in accordance with three variations of a sixth embodiment of the invention.
Figure 7B:
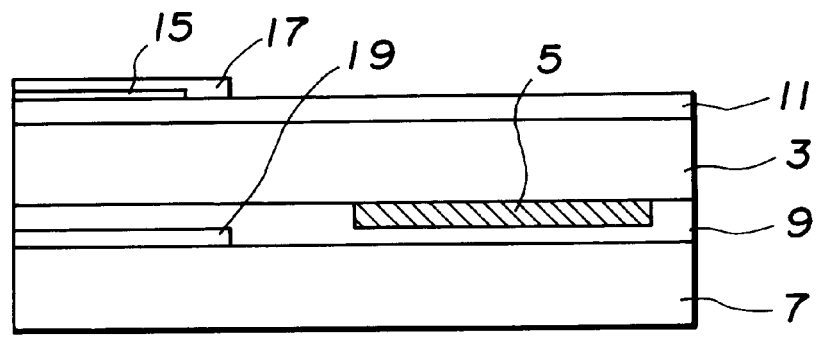
Figure 7C:
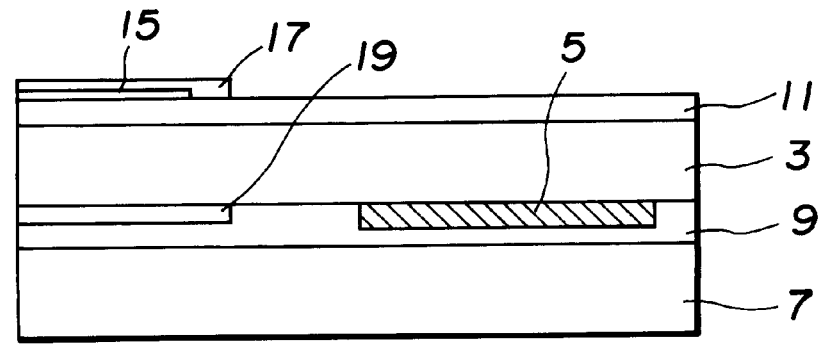

Turning now to the embodiments illustrated in FIG. 7, the optical cards shown in FIGS. 7(a), 7(b) and 7(c) are different from the optical cards shown in FIGS. 1 and 2 in that the second recording layer 15 is provided on one side of the substrate 3 which is remote from the protective layer 7.

In this case, it is preferable to provide the first shielding layer 17 on the surface of the second recording layer 15 which is remote from the substrate 3, and to provide the second shielding layer 19 on either or both of the surface of the protective layer 7 which is remote from the substrate 3, and between the protective layer 7 and the second recording layer 15. In particular, in FIG. 7(a) the first shielding layer 17 is provided on the surface of the second recording layer 15 remote from the substrate 3, whilst the second shielding layer 19 is provided on the surface of the protective layer 7 remote from the substrate 3.

In FIG. 7(b) the first shielding layer 17 is provided on the surface of the second recording layer 15 which is remote from the protective layer 7, whilst the second shielding layer 19 is provided between the protective layer 7 and the adhesive layer 9.

The embodiment shown in FIG. 7(c) is different from that of FIG. 7(b) in that the second shielding layer 19 is provided between the adhesive layer 9 and the substrate 3.

Figure 8:
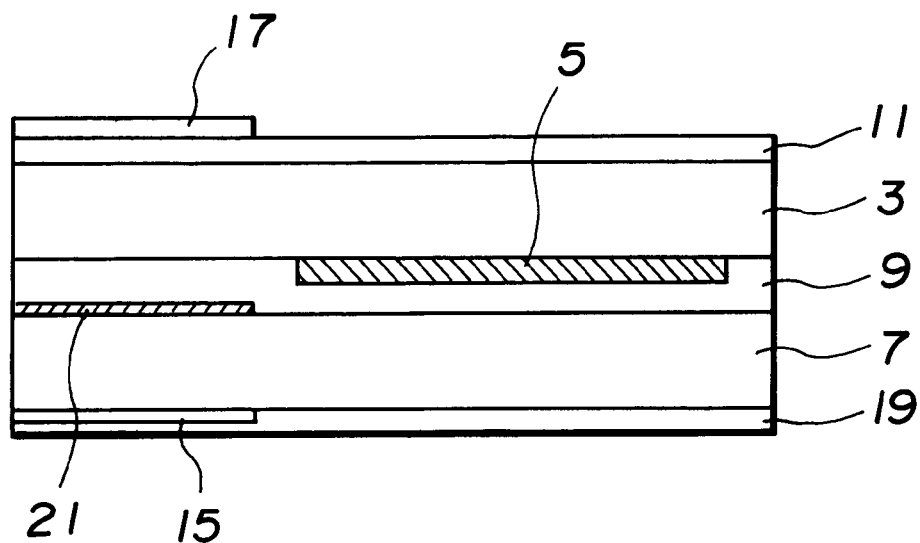
FIG. 8 is a schematic cross sectional view of an information recording medium provided with a reflection layer in accordance with a seventh embodiment of the invention.
Figure 9:
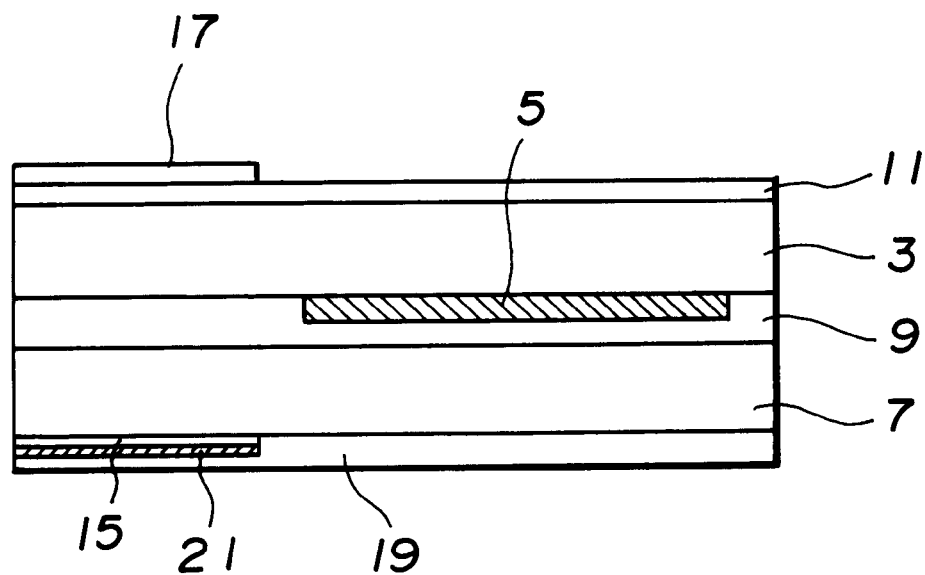
FIG. 9 is a schematic cross sectional view of an information recording medium provided with a reflection layer in accordance with an eighth embodiment of the invention.

FIGS. 8 and 9 show optical cards in which a reflective layer 21 is added to the optical card shown in FIG. 2. In the embodiment shown in FIG. 8, the reflective layer 21 is provided on the surface of the protective layer 7 which opposes the substrate 3. The reflective layer 21 is not recognizable from the substrate 3 side of the card 1 because of the existence of the first shielding layer 17. If the reflective layer 21 is provided on the second recording layer 15 with a transparent layer therebetween, there is an advantage that it is easier to recognize the second recording layer 15 from the edge of the card 1. It is possible to read information recorded on the second recording layer 15 from the edge of the card 1, although information is located inside the card 1. Therefore it is useful when the second recording layer 15 carries much information.

The reflective layer 21 may be formed for example from metal foil or metal evaporated resin film. The reflective layer 21 is attached to the card with adhesive agent. The position of the reflective layer 21 is not restricted to the surface of the protective layer 7 which is remote from the second recording layer 15. For example if the adhesive layer 9 is transparent, the reflective layer can be provided at the interface between the adhesive layer 9 and the substrate 3, or at the interface between the substrate 3 and the transparent protective layer 11, or at the interface between the transparent protective layer 11 and the shielding layer 17.

The reflective layer 21 can alternatively be provided between the second recording layer 15 and the second shielding layer 19 so as to contact the second recording layer 15. In this case contrast of the information which is carried in the second recording layer increases, and reproduction of the information becomes easier.

Instead of inserting the reflective layer 21 in the card 1, the reflective layer 21 may be formed by evaporating or sputtering metal on at least one of the side of the first shielding layer 17 which opposes the second recording layer 15 and the side of the second shielding layer 19 which opposes the second recording layer 15.

The reflective layer 21 can be included in all the optical cards shown in FIGS. 3 to 7. For example in FIG. 3, the reflective layer 21 can be formed at a position between the shielding layer 17 and the transparent protective layer 11, or between the transparent protective layer 11 and the substrate 3, or between the substrate 3 and the adhesive layer 9.

The reflective layer 21 can be formed in a number of positions. In particular the reflective layer 21 can be formed between the second recording layer 15 and the protective layer 4, between the shielding layer 17 and the transparent protective layer 11, between the transparent protective layer 11 and the substrate 3, between the substrate 3 and the adhesive layer 9, or between the second recording layer 15 and the protective layer 7. It a reflective layer 21 is provided at both the positions of between the first shielding layer 17 and the second recording layer 15, and between the second shielding layer 19 and the second recording layer, it is preferable that at least one surface of the second recording layer 15 contacts a transparent member for example the protective layer 7 or the adhesive layer 9.

In the embodiment shown in FIG. 6(a) the reflective layer 21 can be provided between the first shielding layer 17 and the second recording layer 15, for example between the shielding layer-17 and the protective layer 11, between the protective layer 11 and the transparent substrate 3, or between the transparent substrate 3 and the second recording layer 15. The reflective layer 21 may be provided between the second recording layer 15 and the second shielding layer 19, for example between the second recording layer 15 and the adhesive layer 9, between the adhesive layer 9 and the transparent protective layer 7, or between the transparent layer 7 and the second shielding layer 19. The reflective layer 21 may be provided between the first shielding layer 17 and the second recording layer 15, and between the second shielding layer 19 and the second recording layer 15. In this case it is preferable that at least one surface of the second recording layer IS contact a transparent member for example the transparent substrate 1 or the transparent adhesive layer 9.

In the card shown in FIG. 7(a) the reflective layer 21 may be provided between the first shielding layer 17 and the second recording layer 15. The reflective layer 21 may be provided between the transparent substrate 3 and the transparent adhesive layer 9, between the transparent adhesive layer 9 and the transparent protective layer 7, or between the transparent protective layer 7 and the second shielding layer 19. The reflective layer 21 may be provided at a position between the first shielding layer 17 and the second recording layer 15, between the transparent substrate 3 and the transparent adhesive layer 9, between the transparent adhesive layer 9 and the transparent protective layer 7, or between the transparent protective layer 7 and the second shielding layer 19.

In the cards shown in FIGS. 8 and 9, if the reflective layer 21 is provided both between the first shielding layer 17 and the second recording layer 15, and between the second recording layer 15 and the second shielding layer 19, it is preferable that at least one surface of the second recording layer 15 contacts a transparent member, for example the transparent substrate 1, the transparent adhesive layer 9 or the transparent protective layer 7. In these cases it is easier to reproduce information carried in the second recording layer from an edge of the optical card 1.

Figure 10A:
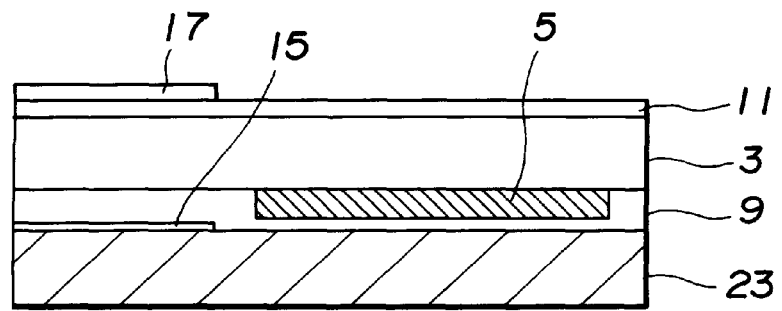
FIGS. 10(a) and 10(b) are respectively schematic cross sectional views of an information recording medium provided with an opaque protective layer in accordance with two variations of a ninth embodiment of the invention.

In the cards shown in FIGS. 5 to 7, the protective layer 7 may be opaque to the light which is used for reproducing information carried in the second recording layer 15, for example visible light. For example in FIG. 10, an opaque to visible light protective layer 23 is substituted for the protective layer 7 of the optical card shown in FIG. 5(a). In this case the shielding layer 19 shown in FIG. 5(a) can be omitted.

In the cards shown in FIGS. 2 to 6, the substrate 3 may be opaque for the light which is used for reproducing information carried in the second recording layer 15, for example visible light. For example in FIG. 11, an opaque substrate 25 is substituted for the substrate 3 of the optical card shown in FIG. 2. In this case the first shielding layer 17 can be omitted. If the opaque substrate 25 is also opaque to the light used for recording information in the first recording layer, or used for reproducing information carried in the first recording layer, it is preferable to provide the second shielding layer 19 at a suitable position which creates no difficulty in recording in the first recording layer and reproducing information carried in the first recording layer by the light passing through the protective layer 7.

It is possible to apply the above mentioned reflective layer to cards which comprise an opaque substrate or opaque protective layer. In the optical card shown in FIG. 10, it is possible to provide a reflective layer between the first shielding layer 17 and the surface protective layer 11, between the surface protective layer 11 and the transparent substrate 3, or between the transparent substrate 3 and the transparent adhesive layer 9.

Figure 11:
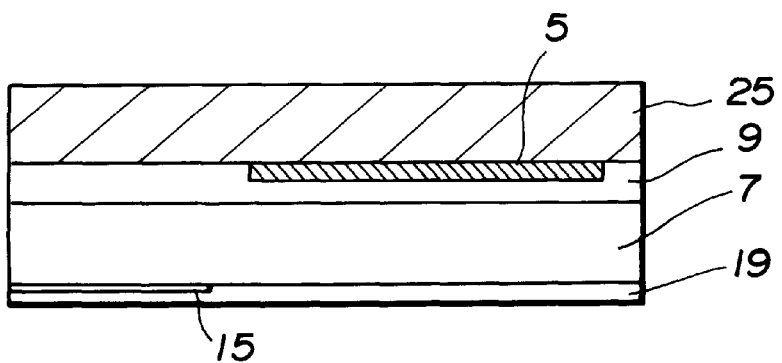
FIG. 11 is a schematic cross sectional view of an information recording medium provided with an opaque substrate in accordance with a tenth embodiment of the invention.

In the optical card shown in FIG. 11, it is possible to provide a reflective layer 21 between the opaque substrate 25 and the transparent adhesive layer 9, between the transparent adhesive layer 9 and transparent protective layer 7, or between the second recording layer and the second shielding layer 19.

Figure 12A:
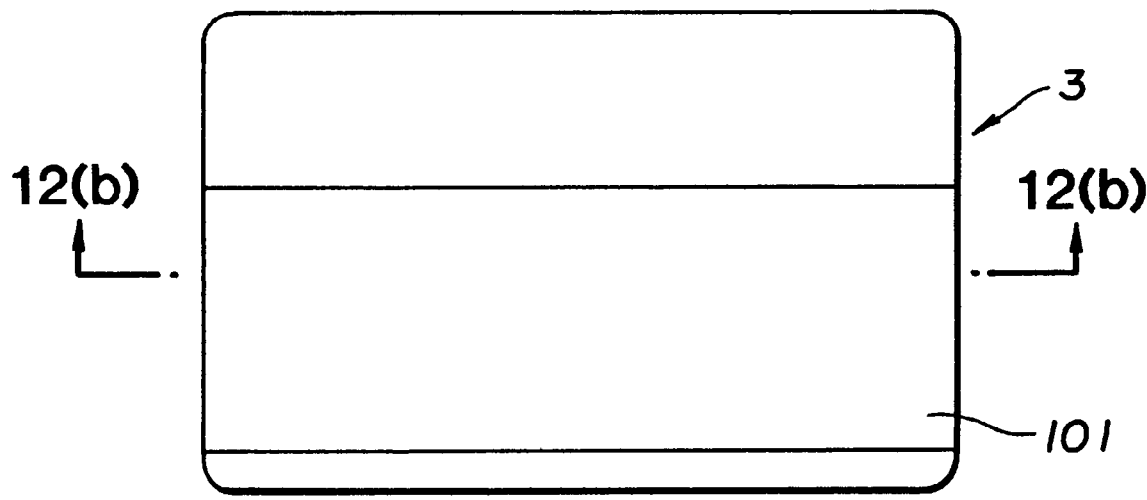
FIG. 12(a) is a schematic plan view of an information recording medium in accordance with an eleventh embodiment of the invention.
Figure 12B:
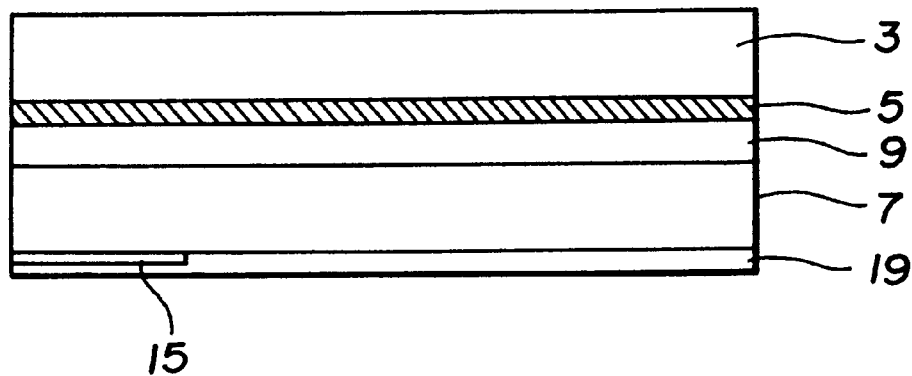
FIG. 12(b) is a schematic cross sectional view taken on line 12(b)—12(b) of the FIG. 12(a).

Referring now to FIGS. 12(a) and 12(b), in the embodiment shown in these Figures the first recording layer 5 is formed on the region 101 of the side of the substrate 3 where a preformat (not shown) is formed. The first recording layer 5 is made of a metallic material and thus acts as a reflective layer. As the first recording layer 5 is opaque, if the first recording layer 5 is provided on the substrate 3 and the second recording layer 15 is provided on a region of the protective layer 7 which is overlaid by the first recording layer 5, it is possible to make the first recording layer function as the reflective layer 21 and the second shielding layer 19. Information carried in the second recording layer 15 can be reproduced only from the edge of the optical card 1 through the transparent protective layer 7, or the transparent protective layer 7 and transparent adhesive layer 9. Recognition of the information from the edge of the optical card is easier because of existence of the reflective layer 21.

In the above described embodiments of the invention, the following advantages may be obtained.

(1) As various information about the card such as a collation mark, manufacturing date, ID information and so on can be carried in the second recording layer which is located inside the card, it is difficult to fake the card. Thus a reliable information recording medium can be obtained.

(2) As the second recording layer 15 which carries the various information is provided next to a transparent layer, and the information carried in the second recording layer 15 can be reproduced only from the edge of the information recording medium, the design of the visible information (for example pictures, photographs, characters, numbers and so on) which is usually provided on the front surface or the back surface of the information medium is not restricted.

(3) As the second recording layer 15 is sealed inside the information recording medium, it is rare that an edge of the medium is rubbed and reading is difficult as a result of flaws. If the edge part is overwritten with fake information, it will be apparent that forgery has taken place. If the second recording layer 15 is to be faked, the laminated structure of the card will have to be destroyed, thus making undetectable faking difficult.

(4) If a reflective layer 21 is provided, it becomes easier to recognize information in the second recording layer 15, and the depth of scope which is readable becomes deeper. Therefore plane information such as character information can be read from the edge of the medium, and it is possible to increase the amount of readable information.

In the following examples of recording media in accordance with embodiments of the invention, and the comparative example not in accordance with the invention, the transmissivity of an opaque shielding layer was measured with a spectrophotometer (trade name:MCPD-1000 (Otsuka Electronics Co. Ltd.)).

EXAMPLE 1

This example describes the production of the optical card 1 shown in FIG. 5(b).

The production of the transparent protective layer 7 provided with the second recording layer 15 and the second shielding layer 19 will now be described.

On one side of a polycarbonate transparent substrate of area 100 mm×100 mm, and thickness 0.3 mm forming the transparent protective layer 7, an opaque printed layer having a transmissivity of 2% or less for visible light was formed by gravure coating using a black ink comprising 2 weight parts of carbon black pigment added to 10 weight parts of a vinyl chloride ink, this opaque printed layer constituting the second shielding layer 19.

Figure 13:
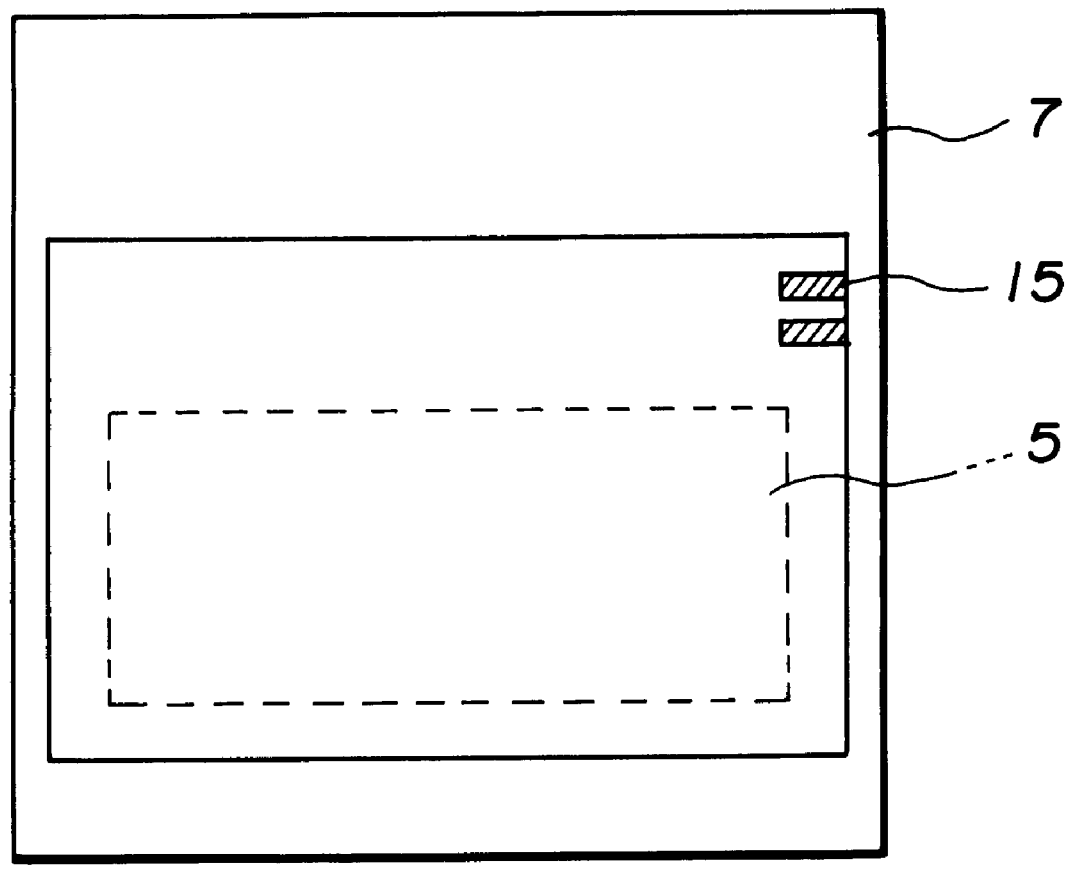
FIG. 13 is an explanatory view of the card of FIG. 12 referred to in EXAMPLE 5.

Referring now also to FIG. 13, on the other side of the polycarbonate transparent substrate 7, the second recording layer 15 in the form of two stripes of 3 mm width and 10 mm length was formed using a two liquid setting type urethane acrylate blue ink (3 weight parts of a blue pigment (No. 440) having a 5 $\mu$m average particle size and 1 weight part of HAC curing agent were mixed with 10 weight parts of RAC ink medium; Seiko Advance Inc.). An opaque first shielding layer 17 of thickness 20 $\mu$m and a transmissivity of 2% or less for visible light was formed so as to cover the second recording layer 15 by gravure coating with a white ink comprising 10 weight parts of vinyl chloride ink and 3 weight parts of titanium oxide pigment.

The production of the transparent substrate 3 provided with a first recording layer 5 and a surface protective layer 11 will now be described.

A polycarbonate transparent substrate 3 of area 100 mm×100 mm, and thickness 0.4 mm was formed to have on one side a preformat (not shown) for the optical card. On the other side of the substrate 3 a urethane acrylate UV setting resin (trade name: UNIDIC (Dainippon Ink and Chemicals Inc.)) was spin coated to 4 $\mu$m thickness and hardened using a UV lamp (80 W/cm) to form a transparent hard coat layer constituting the transparent protective layer 11. On the region of the substrate 3 designed to carry the first recording layer 5, that is the region of the substrate 3, formed into a preformat, a 3 wt % diacetone alcohol solution of 1,1,5,5,-tetrakis (p-diethylaminophenyl) 1,2,4-pentadieniumperchlorate was coated by gravure coating and dried, to form a layer of thickness 1000 Å constituting the first recording layer 5.

In order to produce the optical card 1, the transparent protective layer 7 and the substrate 3 were attached using an ethylene vinylacetate hot-melt type adhesive (trade name: HIRODINE 7500 (Hirodine Kogyo Co. Ltd.)) so that the first shielding layer 17 and the first recording layer 5 were on opposing surfaces as shown in FIG. 5b. The attached substrates were die cut into 85.6 mm×54 mm rectangles to form an optical card of the required size.

Observing the optical card through the edge adjacent to the second recording layer 15, the two blue stripes of the second recording layer 15 were recognizable through the transparent protective layer 7. On the other hand observing the optical card from either of the major surfaces of the card, it was impossible to recognize the second recording layer 15.

EXAMPLE 2

Figure 10B:
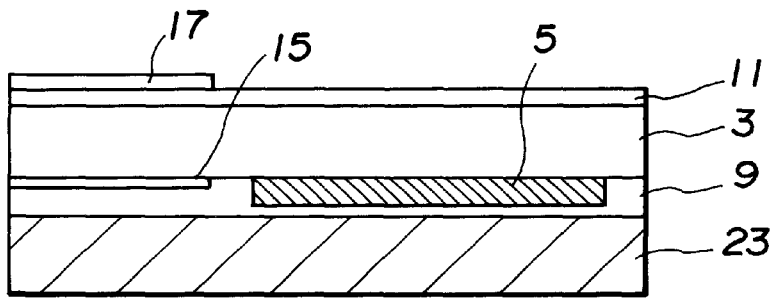

The production of the optical card shown in FIG. 10(b) will now be described.

Firstly, the production of the transparent substrate 3 provided with the first recording layer 5, the second recording layer 15, the surface protective layer 11 and the first shielding layer 17 will be described.

A polycarbonate transparent substrate 3 of area 100 mm×100 mm, and thickness 0.4 mm was formed on one side with a preformat (not shown) for the optical card. On the other side of the substrate 3 a urethane acrylate UV setting resin (trade name: UNIDIC (Dainippon Ink and Chemicals Inc.)) was spin coated to 4 μm thickness and hardened using a UV lamp (80 W/cm) to form a transparent hard coat layer constituting the transparent protective layer 11. On the region of the substrate 3 designed to carry the first optical recording layer 5, that is the region including optical recording the preformat formed surface of the substrate 3, a 3 wt % diacetone alcohol solutionof 1,1,5,5,-tetrakis(p-diethxlaminophenyl) 1,2,4-pentadieniumperchlorate was coated by gravure coating and dried to form a layer of thickness 1000 Å constituting the first recording layer 5.

The second recording layer 15 comprising two stripes was of 3 mm in width, and of 10 mm in length was formed at a chosen position of the same surface of the substrate 3 as the first recording layer 5, using a two liquid setting type urethane acrylate red ink having 3 weight parts of a red pigment (No. 500) and a 5 μm average particle size, and 1 weight part of HAC curing agent composed of an isocyanate resin mixed with 10 weight parts of HAC ink medium(Seiko Advance Inc.). A printed layer whose thickness was 10 μm was formed on a region of the transparent protective layer 11 carried by the substrate 3 in a corresponding position to the second recording layer 15 region by printing a two liquid setting type urethane acrylate black ink (3 weight parts of a black pigment (No. 710) having a 5 μm average particle size and 1 weight part of HAC curing agent mixed with 10 weight parts of HAC ink medium; Seiko Advance Inc.) using a mesh 200 screen block. The printed layer had a transmissivity of 2% or less and functioned as the first shielding layer 17 for shielding the second recording layer 15.

In order to prepare a protective layer 23 opaque to visible light a 20 μm white ink (trade name: SERICOL 13-611 WHITE (Teikoku Printing Inks Mfg. Co. Ltd.)) which was used in EXAMPLE 1 was printed on one side of a white vinylchloride sheet (size 100 mm×100 mm, thickness 0.3 mm).

To produce the optical card 1, the prepared substrate 3 and the protective layer 23 were attached using a 60 μm hot-melt type adhesive (trade name: EVAFLEX 7580 (Hirodine Kogyo Co. Ltd.)) composed of ethylene-vinylacetate co-polymer so that the first recording layer 5 was opposed to the printed layer unformed surface of the protective layer 23. The attached layers were die cut into a 85.6 mm×54 mm rectangle to form an optical card of the required size.

Observing the optical card 1 through the edge adjacent the second recording layer 15, two red stripes were recognizable through the 0.3 mm thickness transparent substrate 3. On the other hand observing the optical card 1 directly through the two major surfaces, it was impossible to recognize the second recording layer 15.

EXAMPLE 3

This example describes the production of the optical card shown in FIG. 6(b).

The production of the transparent substrate 3 provided with the first recording layer 5, the first shielding layer 17, a second recording layer 15 and the surface protective layer 11 will first be described.

A polycarbonate transparent substrate 3 of area 100 mm×100 mm, and thickness 0.4 mm was provided on one side with a preformat for the optical card. On the other side of the substrate 3 a urethane acrylate UV setting resin (trade name: UNIDIC (Dainippon Ink and Chemicals Inc.)) was spin coated to 4 μm thickness and hardened using a UV lamp (80 W/cm) to form a transparent hard coat layer constituting the transparent protective layer 11. On the optical recording region indicated as 5 in FIG. 13 of the preformat formed surface of the substrate, a 3 wt % diacetone alcohol solution of 1,1,5,5,-tetrakis (p-diethylaminophenyl) 1,2,4-pentadieniumperchlorate was coated by gravure coating and dried to form a layer 5 of thickness 1000 Å constituting the first recording layer 5.

On the surface of the substrate 3 carrying the first recording layer 5 at a position separate from the first recording layer 5, a white ink (trade name: SERICOL 13-611 WHITE (Teikoku Printing Inks Mfg. Co. Ltd.)) as was used in EXAMPLE 1 was gravure coated to prepare a 20 μm white opaque printed layer constituting the first shielding layer 17. Then a second recording layer 15 was formed on the first shielding layer 17 in the same way as EXAMPLE 1.

In order to produce a protective layer 7 provided with a second shielding layer 19, a white ink (trade name: SERICOL 13-611 WHITE (Teikoku Printing Inks Mfg. Co. Ltd.)) as used in EXAMPLE 1 was gravure coated on one side of a transparent polycarbonate substrate of area 100 mm×100 mm, and thickness 0.3 mm.

This produced a 20 μm printed layer acting as a second shielding layer 19 having a transmissivity of 2% or less for visible light.

In order to produce the optical card, the prepared substrate 3 and the protective layer 7 were attached in the same way as in EXAMPLE 1 so that the first recording layer 5 carried by the substrate 3 opposed the second shielding layer 19 formed on the surface of the protective layer 7. Then the attached layers were die cut to the required size to form an optical card.

Observing the side of the optical card where the second recording layer was exposed, two blue stripes were recognizable through the transparent adhesive layer 9 and the transparent protective layer 7. On the other hand observing the optical card directly through the two major surfaces, it was impossible to recognize the second recording layer 15.

REFERENCE EXAMPLE

A transparent substrate 3 provided with a first recording layer 5, a first shielding layer 17, a second recording layer 15 and a surface protective layer 11 was produced in the same way as EXAMPLE 3. Then the same protective layer 7 as the optical card in EXAMPLE 3 was prepared.

The prepared substrate 3 and the protective layer 7 were attached the same way as in EXAMPLE 1 so that the first recording layer 5 of the substrate 3 opposed the printed layer 19 formed on the surface of the protective layer 7. The attached substrates were die cut to form an optical card.

Observing the optical card through the edge adjacent to the second recording layer, it was difficult to recognize two blue stripes because the thickness of the transparent layer which one surface of the second recording layer contacted was only 60 µm, that is the thickness of the transparent adhesive.

EXAMPLE 4

This example describes the production of the optical card shown in FIG. 8.

Firstly the production of the protective layer 7 provided with the second recording layer 15, the second shielding layer 19 and the reflective layer 21 will be described.

A polycarbonate transparent substrate 7 of area size 100 mm×100 mm, and thickness 0.4 mm and a second recording layer 15 were formed in the same way as in EXAMPLE 1. A white ink (trade name: SERICOL 13-611 WHITE (Teikoku Printing Inks Mfg. Co. Ltd.)) as used in EXAMPLE 1 was gravure coated so as to cover the whole of the second recording layer 15 to produce a 20 µm printed layer to act as the second shielding layer 19. At a position corresponding to the position of the second recording layer 15 but on the opposite side of the transparent substrate 7 an aluminum foil of thickness 15 µm was hot-stamped to form a reflective layer 23.

The production of the transparent substrate 3, the first recording layer 5, the surface protective layer 11, and the first shielding layer 17 will now be described.

A polycarbonate transparent substrate 3 of area 100 mm×100 mm, and thickness 0.4 mm having on one side a preformat (not shown) for an optical card was formed. On the other side of the substrate 3 a urethane acrylate UV setting resin (trade name: UNIDIC (Dainippon Ink and Chemicals Inc.)) was spin coated to 4 µm thickness and hardened using a UV lamp (80 W/cm) to form a transparent hard coat layer constituting the transparent protective layer 11. In the region designed to be the optical recording region on the surface of the substrate including the preformat, a 3 wt % diacetone alcohol solution of 1,1,5,5,-tetrakis diethylaminophenyl) 1,2,4-pentadieniumperchlorate was coated by gravure coating and dried to form a layer of thickness 1000 Å constituting the first recording layer 5.

A first shielding layer 17 whose transmissivity was 2% or less designed to shield the second recording layer 15 was formed on the transparent protective layer 11 of the substrate using a two liquid setting type urethane acrylate white ink (3 weight parts of a white pigment (No. 120) having 5 µm average particle size and 1 weight part of HAC curing agent mixed with 10 weight parts of HAC ink medium; Seiko Advance Inc.). The first shielding layer 17 was dried to form a 20 µm thickness.

In order to produce the optical card, the prepared substrate 3 and the protective layer 7 were attached as in EXAMPLE 1 so that the reflective layer 21 carried by the protective layer 7 opposed the first recording layer 5 carried by the substrate 3. Then the attached substrates 3, 7 were die cut to the correct size to form an optical card.

Observing the optical card through the edge adjacent the second recording layer 15, two blue stripes were recognizable through the transparent protective layer 7. On the other hand observing the optical card directly through either of two major surfaces of the optical card, it was impossible to recognize the second recording layer 15.

EXAMPLE 5

This example describes the production of the optical card shown in FIG. 12.

The production of a substrate 3 provided with a first recording layer 5 will first be described.

A polycarbonate transparent substrate of area 100 mm×100 mm, and thickness 0.4 mm was formed on one side with a preformat (not shown) for the optical card. On the other side of the substrate 3, a urethane acrylate UV setting resin (trade name: UNIDIC (Dainippon Ink and Chemicals Inc.)) was spin coated to a 4 µm thickness and hardened using a UV lamp (80 W/cm) to form a transparent hard coat layer constituting the transparent protective layer 11. In the region indicated as 101 in FIG. 12(a) of the preformat formed surface of the substrate 3, a tellurium film of 1200 Å was evaporated to form the first recording layer 5.

The production of the transparent protective layer 7 provided with the second recording layer 15, and the second shielding layer 19 will now be described.

In a position on one side of a polycarbonate transparent substrate of size 100 mm×100 mm, and thickness 0.4 mm overlaid by the first recording layer 5 of the substrate 3 as described, characters being a right-left reversed version of [OPTICAL CARD] were printed with the same blue ink used in EXAMPLE 1 for the second recording layer to form a second recording layer 15. Then a white ink (trade name: SERICOL 13-611 WHITE (Teikoku Printing Inks Mfg. Co. Ltd.)) as used in EXAMPLE 1 was printed so as to cover the second recording layer 15 to prepare a 20 µm opaque layer having a transmissivity of 2% or less as to visible light, constituting the second shielding layer 19.

In order to produce the optical card, the prepared substrate 3 and the protective layer 7 were attached the same way as in EXAMPLE 1 so that the first recording layer 5 carried by the substrate 3 was directed opposed towards the second recording layer 15 formed on the surface of the protective layer 7. Then the attached substrates 3, 7 were die cut to form an optical card.

Observing the optical card directly through the two major surfaces of the card, it was impossible to recognize the character information carried by the recording layer 15 formed inside the optical card. On the other hand observing the optical card through the edge adjacent the first recording layer 5, the surface of the first recording layer 5 which was directed towards the second recording layer 15 functioned as a reflective layer 21 and the information carried in the second recording layer was reflected. Therefore it was possible to recognize the information through the transparent adhesive layer 9 and the transparent protective layer 7.

EXAMPLE 6

This example describes the production of an optical card shown in FIG. 7(c).

First, the production of a transparent protective layer 7 provided with a second recording layer 15 and a second shielding layer 19 will be described.

A polycarbonate transparent substrate 3 of area 100 mm×100 mm, and thickness 0.4 mm was formed on one side with a preformat (not shown) for an optical card. On the other side of the substrate 3, a urethane acrylate UV setting resin (trade name: UNIDIC (Dainippon Ink and Chemicals Inc.)) was coated to 4 µm thickness by a bar coating method and hardened using a UV lamp (80 W/cm) to form a surface protective layer 11.

On the region of the surface protective layer 11 where a magnetic stripe is going to be formed, a two liquid setting type urethane acrylate transparent ink (1 weight part of HAC curing agent mixed with 10 weight parts of HAC ink medium; Seiko Advance Inc.) and a two liquid setting type urethane acrylate red ink (3 weight parts of a red pigment (No. 510) having a 5 µm average particle size and 1 weight part of HAC curing agent mixed with 10 weight parts of HAC ink medium; Seiko Advance Inc.) were prepared as a receiving layer for the magnetic stripe.

Figure 14:
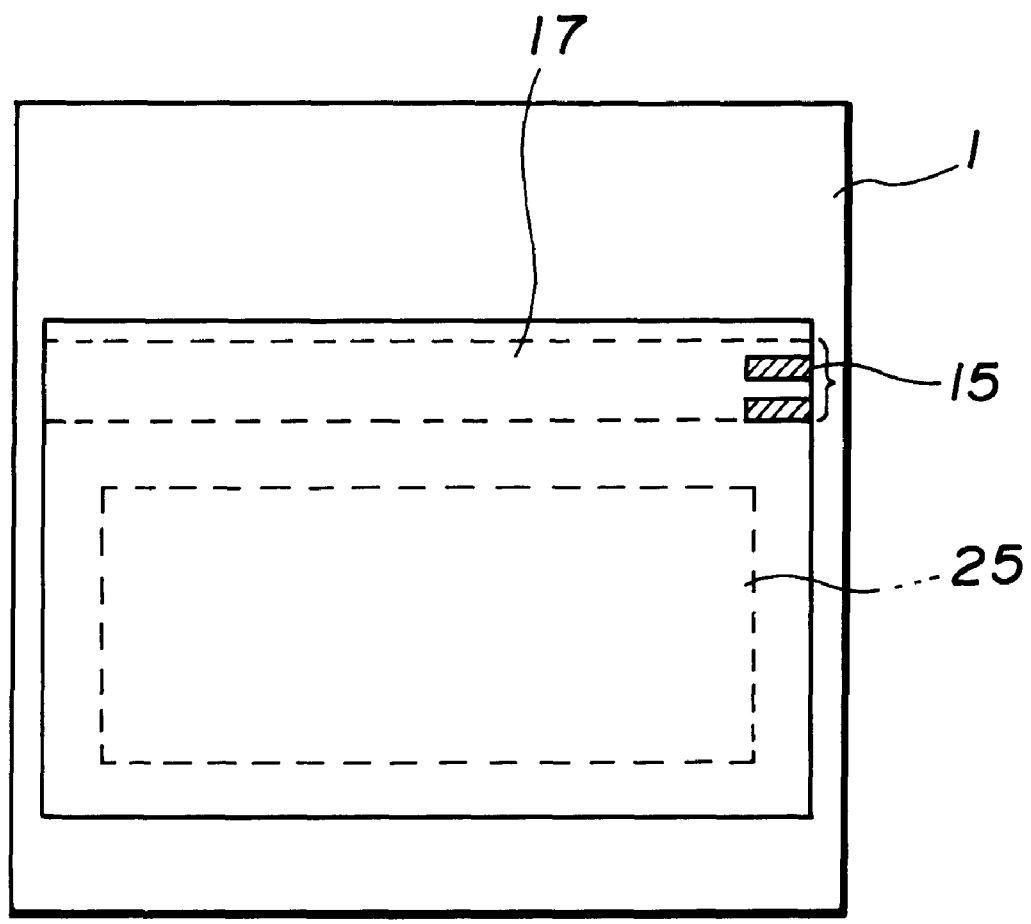
FIG. 14 is an explanatory view of the card of FIG. 7(c) as referred to in EXAMPLE 6.

Referring now also to FIG. 14, on a part of the second recording layer 15 in a position corresponded to an edge of the optical card the red-ink, and on the other part designed for formation of the magnetic stripe, the transparent ink were printed, using a mesh 200 screen block for both inks. Then the printed parts were dried to form the magnetic stripe receiving layer composed of the 10 µm thick red second recording layer and the transparent printed layer.

An opaque magnetic film (trade name: ISO-GEOO-114 (TOKYO JIKI INSATSU Co. Ltd.)) whose transmissivity was 2% or less and whose width was 11.4 mm, having an adhesive layer on its back surface, was then attached using the adhesive layer to the above mentioned receiving layer to form a first shielding layer 17 for shielding the second recording layer 15.

On the optical recording region of the surface of the substrate 3 carrying the preformat, a 3 wt % diacetone alcohol solution of 1,1,5,5,-tetrakis (p-dietheylaminophenyl) 1,2,4-pentadieniumperchlorate was coated by gravure coating and dried to form a layer of thickness 1000 Å constituting the first recording layer 5.

At a position on the surface of the substrate 3 carrying the preformat, corresponding to the position of the second recording layer 17, a white ink (trade name: SERICOL 13-611 WHITE (Teikoku Printing Inks Mfg. Co. Ltd.)) as used in EXAMPLE 1 was printed to prepare a 20 µm white opaque printed layer having a transmissivity of 2% or less for visible light, this acting as the second shielding layer 19.

A polycarbonate transparent substrate (size 100 mm×100 mm, thickness 0.3 mm) was prepared as the protective layer 7.

The prepared substrate 3 and the protective layer 7 were attached the same way as in EXAMPLE 1 so that the first recording layer 5 carried by the substrate 3 is directed towards the protective layer 7. The attached substrates 3, 7 were die cut to form an optical card of the correct dimensions.

Observing the optical card through the edge adjacent the second recording layer 15, it was possible to recognize the bar code through the transparent substrate 7. On the other hand observing the optical card directly through either of the major surfaces of the optical card, it was impossible to recognize the second recording layer 15.

EXAMPLE 7

In this example, an optical card was prepared in the same way as in EXAMPLE 6, except that a five figure number was used as the second recording layer inside the magnetic stripes in EXAMPLE 6 each number being 1 mm×1 mm in size, and the shielding layer 17 was provided on the side of the protective layer 7 which contacted with the adhesive layer 9.

It was impossible to recognize the information in the second recording layer 15 from either of the major surfaces of the card. However, the five figure number was recognizable from the edge Of the card.

EXAMPLE 8

In this example, an optical card was prepared in the same way as in EXAMPLE 6, except that a picture of 2 mm×5 mm size instead of the bar code was used in the second recording layer inside the magnetic stripes in EXAMPLE 6, and the second shielding layer 19 was provided on the side of the protective layer 7 remote from the adhesive layer 9.

The thickness of the substrate 3 was 0.4 mm. The thickness of the adhesive layer 9 was 60 µm. The thickness of the protective layer 7 was 0.3 mm.

Observing the card through the edge of the card adjacent the second recording layer, it was possible to recognize the picture pattern through the transparent substrate 3, transparent adhesive layer 9 and the protective layer 7. On the other hand observing the optical card directly from either of the major surfaces of the card, it was impossible to recognize the picture pattern.

EXAMPLE 9

This example describes the production of a magnetic tape carrying the second recording layer 15 on the surface.

A two liquid setting type urethane acrylate red ink (3 weight parts of a red pigment (No. 510) having 5 µm average particle size and 1 weight part of HAC curing agent mixed to 10 weight parts of HAC ink medium; Seiko Advance Inc.) was prepared and gravure coated on a region of an adhesive layer provided on a back surface of the magnetic film (trade name: ISO-GEOO-114 (TOKYO JIKI INSATSU CO. Ltd.)) used in EXAMPLE 6 corresponding to the edge of the card. The second recording layer composed of two stripes of 10 micron thickness, 3 mm width and 10 mm length was provided on the magnetic tape.

The production of the transparent protective layer 7 provided with the second shielding layer 19 and the second recording layer will now be described.

A transparent polycarbonate substrate (size 100 mm×100 mm, thickness 0.3 mm) was prepared as the protective layer 7. The magnetic tape provided with the second recording layer was laminated on the protective layer 7 so that the side of the second recording layer 15 contacted the protective layer 7. Then the substrates were pressed at 100° C. to unite the protective layer and the magnetic tape to form a transparent protective layer 7 provided with the second recording layer 15. The magnetic stripes which had a transmissivity of 2% or less as to visible light acted as the second shielding layer 19.

The transparent substrate provided with the first recording layer 5, the surface protective layer 11 and the first shielding layer 17 were prepared the same way as in the EXAMPLE 4.

In order to produce the optical card, the prepared substrate 3 and the protective layer 7 were attached same way as in EXAMPLE 1 so that the side of the protective layer 7 on which the second recording layer 15 and the magnetic stripes were not provided was directed towards the side of the substrate 3 carrying the first recording layer 5. Then the attached substrates were die cut to form an optical card.

Observing the card under visible light, it was possible to recognize the red stripes through the transparent substrate 3, the transparent adhesive layer 9 and the transparent protective layer 7. On the other hand observing the optical card directly through the major surfaces of the card, it was impossible to recognize the second recording layer 15.

EXAMPLE 10

In this example, an optical card was prepared in the same way as in EXAMPLE 9, except that a five figure number of 1 mm×1 mm size was used as the information on the second recording layer 15 in EXAMPLE 9, and the first shielding layer 17 was provided on the side of the transparent substrate 3 which was opposed to the protective layer so that the first shielding layer was overlaid by the second recording layer.

It was impossible to recognize the numerals carried by the second recording layer 15 by observing the card under visible light directly through one of the major surfaces of the card. However, the five figure number was recognizable through the transparent adhesive layer and the transparent protective layer from the edge of the card.

EXAMPLE 11

In this example, an optical card was prepared in the same way as in EXAMPLE 9, except that a 2 mm×5 mm size pattern was drawn instead of the two stripes, and the shielding layer was provided on a side of the transparent substrate so that the shielding layer was overlaid by the second recording layer located inside the magnetic tape.

It was impossible to recognize the pattern of the second recording layer by observing the card directly through one of the major surfaces of the card under visible light. But the pattern was recognizable through the transparent adhesive layer and the transparent protective layer from the edge of the card.

EXAMPLE 12

This example describes the production of a magnetic tape provided with a protective layer and a second recording layer.

An aluminum reflective layer of thickness 1000 Å was formed on the back surface of the same magnetic tape used in EXAMPLE 9 by vacuum evaporation. Then at a position on the reflective layer corresponding to the edge of the card, bar code information was printed as the second recording layer 15 by screen printing the same two liquid setting type urethane acrylate ink used in the EXAMPLE 9. An ethylene metaacrylic acid hot-melt type adhesive (trade name: NUCREL (DUPONT-MITSUI POLYCHEMICAL CO. LTD.)) of thickness 5 μm was formed on the reflective layer so as to cover the second recording layer 15 with the adhesive layer 9. The adhesive layer 9 had a transmissivity of 95% or more as to the visible light.

The optical card was prepared in the same way as in EXAMPLE 9, except that the magnetic film was used.

Observing the card under the visible light, it was possible to recognize the bar code through the transparent substrate 3, the transparent adhesive layer 9 and the transparent protective layer 7. On the other hand observing the optical card directly through the major surfaces of the card, it was impossible to recognize the second recording layer 15.

EXAMPLE 13

This example describes the production of the optical card shown in FIG. 2.

First, the production of a transparent protective layer 7 provided with a second recording layer 15 and a second shielding layer will be described.

A polycarbonate transparent substrate of area size 100 mm×100 mm, and thickness 0.3 mm was prepared. On a certain region of one side of the substrate a second protective. layer 15 comprised of two stripes of width 3 mm, and length 10 mm was printed using blue ink. Then a white ink (trade name: SERICOL 13-611 WHITE (Teikoku Printing Inks Mfg. Co. Ltd.)) as used in EXAMPLE 1, was printed on the whole second recording layer so as to cover the second recording layer 15 to prepare a 20 μm opaque layer of a transmissivity of 2% or less for visible light constituting the second shielding layer 19.

The production of a transparent substrate 3 provided with the surface protective layer 11, the first shielding layer 17 and the first recording layer 5 will now be described.

A polycarbonate transparent substrate of area 100 mm×100 mm, and thickness 0.4 mm was formed on one side with a preformat for an optical card. On the other side of the substrate 3 a urethane acrylate UV setting resin (trade name: UNIDIC (Dainippon Ink and Chemicals Inc.)) was spin coated to 4 μm thickness and hardened using a UV lamp (80 W/cm) to form a transparent hard coat layer constituting the transparent protective layer 11. On an optical recording region of the preformat formed surface of the substrate a 3 wt % diacetone alcohol solution of 1,1,5,5,-tetrakis (diethxlaminophenyl) 1,2,4-pentadieniumperchlorate was coated by gravure coating and dried to form a layer of 1000 Å thickness forming the first recording layer 5.

In order to produce the optical card, the prepared substrate 3 and the protective layer 7 were attached the same way as in EXAMPLE 1 so that the surface of the protective layer on which the second recording layer was not formed was directed towards the first recording layer 5 of the substrate 3.

A two liquid setting type urethane acrylate silver ink (3 weight parts of a silver pigment (606A) having a 3 μm average particle size and 1 weight part of HAC curing agent mixed with 10 weight parts of HAC ink medium; Seiko Advance Inc.) was prepared. Then, on the region of the surface protective layer 11 of the attached substrates corresponding to the position of the second recording layer 15, the silver ink was printed using a 225 mesh screen block to form a layer 17 of thickness 20 μm constituting the first shielding layer. Then the substrates were die cut to form an optical card which had 85.6 mm×54 mm size.

Observing the side edge of the optical card adjacent the second recording layer 15, it was possible to recognize the blue stripes through the transparent adhesive whose thickness was 60 μm and the transparent protective layer. On the other hand observing the optical card directly through the major surfaces of the card, it was impossible to recognize the second recording layer.

What we claim is:

1. An information recording medium comprising a stack of layers including a recorded layer and two shielding layers opaque to visible light, the recorded layer being interposed between said two shielding layers, and at least one layer which is transparent to visible light, said recorded layer being adjacent to said one layer which is transparent to visible light, said recorded layer abutting a side edge of the medium and having a width and a depth that do not exceed a corresponding width and depth of said shielding layers; the recorded layer being visibly readable from a side edge of the medium.

2. An information recording medium according to claim 1, further including a recording layer, wherein the recording layer and the recorded layer do not overlap.

3. An information recording medium according to claim 2, including a reflective layer arranged to reflect visible light through said at least one layer which is transparent to visible light onto said recorded layer,
   wherein said reflective layer is formed at least in part by said recording layer.

4. An information recording medium according to claim 2, in which said recording layer is interposed between at least two of said layers.

5. An information recording medium according to claim 4 in which said two layers between which the recording layer is interposed comprise a substrate and a protective layer.

6. An information recording medium according to claim 5 in which one of said two layers forms one of said two shielding layers.

7. A medium according to claim 1 wherein at least one of the shielding layers comprises a magnetic recording medium.

8. An information recording medium according to claim 1 including a reflective layer arranged to reflect visible light through said at least one layer which is transparent to visible light onto said recorded layer.

9. An information recording medium according to claim 8 in which the reflective layer constitutes one of the shielding layers.

10. An information recording medium according to claim 1 including an integrated circuit.

11. A process for production of an information recording medium according to claim 1 including the steps of forming said stack of layers and laminating said stack of layers.

12. An information recording medium comprising a substrate, a recording layer, and a protective layer in this order, at least one of the substrate and the protective layer being transparent to radiation used to record information to the recording layer or read information stored in the recording layer, and at least one of the substrate and the protective layer being transparent to visible light, the information recording medium further comprising a recorded layer carrying information and not overlapping the recording layer, a first shielding layer, and a second shielding layer, both of the shielding layers being opaque to visible light, wherein the recorded layer is disposed adjacent to at least one of the substrate and the protective layer which is transparent to visible light, said recorded layer abutting a side edge of the medium and having a width and a depth that do not exceed a corresponding width and depth of said shielding layers, and the recorded layer is interposed between the first shielding layer and the second shielding layer so that the information carried by the recorded layer is visibly readable from a side edge of the medium.

13. The information recording medium according to claim 12, wherein the protective layer is bonded to the substrate with an adhesive layer which is transparent to visible light.

14. The information recording medium according to claim 13, wherein the recorded layer is disposed between the protective layer and the adhesive layer.

15. The information recording medium according to claim 12, wherein the substrate and the protective layer are transparent to visible light.

16. The information recording medium according to claim 12, wherein the recorded layer is disposed between the substrate and the protective layer.

17. The information recording medium according to claim 16, wherein the substrate and the protective layer are transparent to visible light, and the first shielding layer is disposed between the substrate and the recorded layer, or on a side of the substrate remote from the protective layer, and the second shielding layer is disposed between the protective layer and the recorded layer, or on a surface of the protective layer remote from the substrate.

18. The information recording medium according to claim 12, wherein the recorded layer is disposed on the side of the substrate remote from the protective layer, the substrate being transparent to visible light.

19. The information recording medium according to claim 18, wherein the substrate and the protective layer are transparent to visible light, and the first shielding layer is disposed on a side of the recorded layer remote from the substrate, and the second shielding layer is disposed between the recorded layer and the protective layer, or on a side of the protective layer remote from the substrate.

20. The information recording medium according to claim 12, wherein the recorded layer is disposed on the side of the protective layer remote from the substrate, the protective layer being transparent to visible light.

21. The information recording medium according to claim 20, wherein the substrate and the protective layer are transparent to visible light, and the first shielding layer is disposed on a side of the substrate remote from the protective layer, or between the substrate and the recorded layer, and the second shielding layer is disposed on a side of the recorded layer remote from the protective layer.

22. An information recording medium comprising a substrate, a recording layer, and a protective layer in this order, the recording layer being disposed on a surface of the substrate, the substrate being transparent to radiation used to record information to the recording layer or read information stored in the recording layer, and the protective layer being transparent to visible light, the information recording medium further comprising a first and a second shielding layer, both of which are opaque to visible light, and a recorded layer carrying information, the first shielding layer being disposed on a surface of the protective layer opposed to the substrate, and the second shielding layer being disposed on a surface of the recorded layer remote from the protective layer, the recording layer having a width and a depth that do not exceed a corresponding width and depth of said shielding layers, wherein the recorded layer abuts a side edge of the medium, and the recorded layer is disposed on a surface of the protective layer remote from the substrate, and disposed between the first and the second shielding layers so that the information on the recorded layer is visibly readable from a side edge of the medium.

23. An information recording medium comprising a substrate, a recording layer and a protective layer in this order, the substrate being transparent to radiation used to record information to the recording layer or read information stored in the recording layer, the protective layer being transparent to visible light, and the recording layer being disposed on a surface of the substrate and being opaque to visible light, the information recording medium further comprising a recorded layer carrying information and a shielding layer opaque to visible light, wherein the recorded layer abuts a side edge of the medium and has a width and a depth that do not exceed a corresponding width and depth of said recording layer and the shielding layer, and wherein the recorded layer is disposed on a surface of the protective layer remote from the substrate, and disposed between the recording layer and the shielding layer so that the information on the recorded layer is visibly readable from a side edge of the medium.

* * * * *

UNITED STATES PATENT AND TRADEMARK OFFICE
CERTIFICATE OF CORRECTION

PATENT NO. : 6,177,176 B1
DATED : January 23, 2001
INVENTOR(S) : Hiroshi Tanabe et al.

It is certified that error appears in the above-identified patent and that said Letters Patent is hereby corrected as shown below:

Column 1,
Line 9, "exclusively" should read -- exclusively, --.
Line 16, "as a" should read -- as --.
Line 27, "face" should read -- face, --.

Column 3,
Line 18, "the" should be deleted.

Column 4,
Line 28, "take" should read -- fake --.
Line 51, "150pm" should read -- 150 $\mu$m --.

Column 5,
Line 33, "an" should be deleted.

Column 8,
Line 3, "It" should read -- If --.
Line 6, "layer," should read -- layer 15, --.
Line 8, "member" should read -- member, --.
Line 13, "layer-17" should read -- layer 17 --.
Line 26, "IS" should read -- 15 --; and "member" should read -- member, --.

Column 9,
Line 21, "layer" should read -- layer 15 --.

Column 10,
Line 32, "RAC" should read -- HAC --.

Column 11,
Line 2, "hand" should read -- hand, --.
Line 20, "of-the" should read -- of the --.
Line 23, "solutionof" should read -- solution of --.
Line 24, "diethxlaminophenyl)" should read -- diethylaminophenyl) --.
Line 27, "was" should be deleted.
Line 65, "hand" should read -- hand, --.
Line 66, "the-" should read -- the --.

Column 13,
Line 60, "hand" should read -- hand, --.

UNITED STATES PATENT AND TRADEMARK OFFICE
CERTIFICATE OF CORRECTION

PATENT NO.    : 6,177,176 B1
DATED         : January 23, 2001
INVENTOR(S)   : Hiroshi Tanabe et al.

It is certified that error appears in the above-identified patent and that said Letters Patent is hereby corrected as shown below:

Column 14,
Line 40, "hand" should read -- hand, --.

Column 15,
Line 9, "red-ink," should read -- red ink, --.
Line 47, "hand" should read -- hand, --.
Line 63, "Of" should read -- of --.

Column 16,
Line 10, "transpar-" should read -- the transpar- --.
Line 12, "hand" should read -- hand, --.
Line 47, "the" (second occurrence) should be deleted.
Line 50, "same" should read -- the same --.
Line 59, "hand" should read -- hand, --.

Column 17,
Line 49, "hand" should read -- hand, --.
Line 63, "tive." should read -- tive --.

Column 18,
Line 41, "hand" should read -- hand, --.

Signed and Sealed this

Twenty-fifth Day of February, 2003

JAMES E. ROGAN
*Director of the United States Patent and Trademark Office*